United States Patent
Prince et al.

[15] 3,667,191
[45] June 6, 1972

[54] REMOVAL OF PARTICULATE MATTER FROM GASEOUS WASTES BY WET COLLECTORS

[72] Inventors: Martin Prince, Wayne, N.J.; Hillard Blanck, Floral Park, N.Y.; Gregorio Tarancon, Elizabeth, N.J.

[73] Assignee: Saleen Development Corp., New York, N.Y.

[22] Filed: Nov. 24, 1970

[21] Appl. No.: 92,410

[52] U.S. Cl. ..................... 55/87, 55/84, 55/89, 55/220, 252/88
[51] Int. Cl. ........................... B01d 47/10
[58] Field of Search ............. 55/84, 87, 89, 93, 94, 220; 252/88

[56] References Cited

UNITED STATES PATENTS

| | | |
|---|---|---|
| 1,816,525 | 7/1931 | Gutensohn.................55/84 |
| 2,188,439 | 1/1940 | Kirkpatrick..............252/88 |
| 3,044,235 | 7/1962 | Schneider................55/84 |

Primary Examiner—John Adee
Attorney—Lewis H. Eslinger, Alvin Sinderbrand and Curtis, Morris & Safford

[57] ABSTRACT

In the removal of particulate matter from gaseous wastes by wet collectors, such as venturi scrubbers, the liquid employed to achieve such removal is water with an additive dissolved therein to substantially improve the collection of the particulate matter thereby. The additive dissolved in the water has, as its essential constituent, a preferably reactive mixture of an alkyl or dialkyl-phenyl polyethoxy alcohol, an N-substituted acid amide and an ethoxylated fatty alcohol. The alkyl or dialkyl-phenyl polyethoxy alcohol and the N-substituted acid amide are preferably present in the additive mixture in approximately equal molar amounts and preferably each comprise at least 35 wt. % of the mixture, and the ethoxylated fatty alcohol may comprise from ½ to 40 wt. % of the mixture and preferably from 1 to 30 wt. % thereof.

23 Claims, 1 Drawing Figure

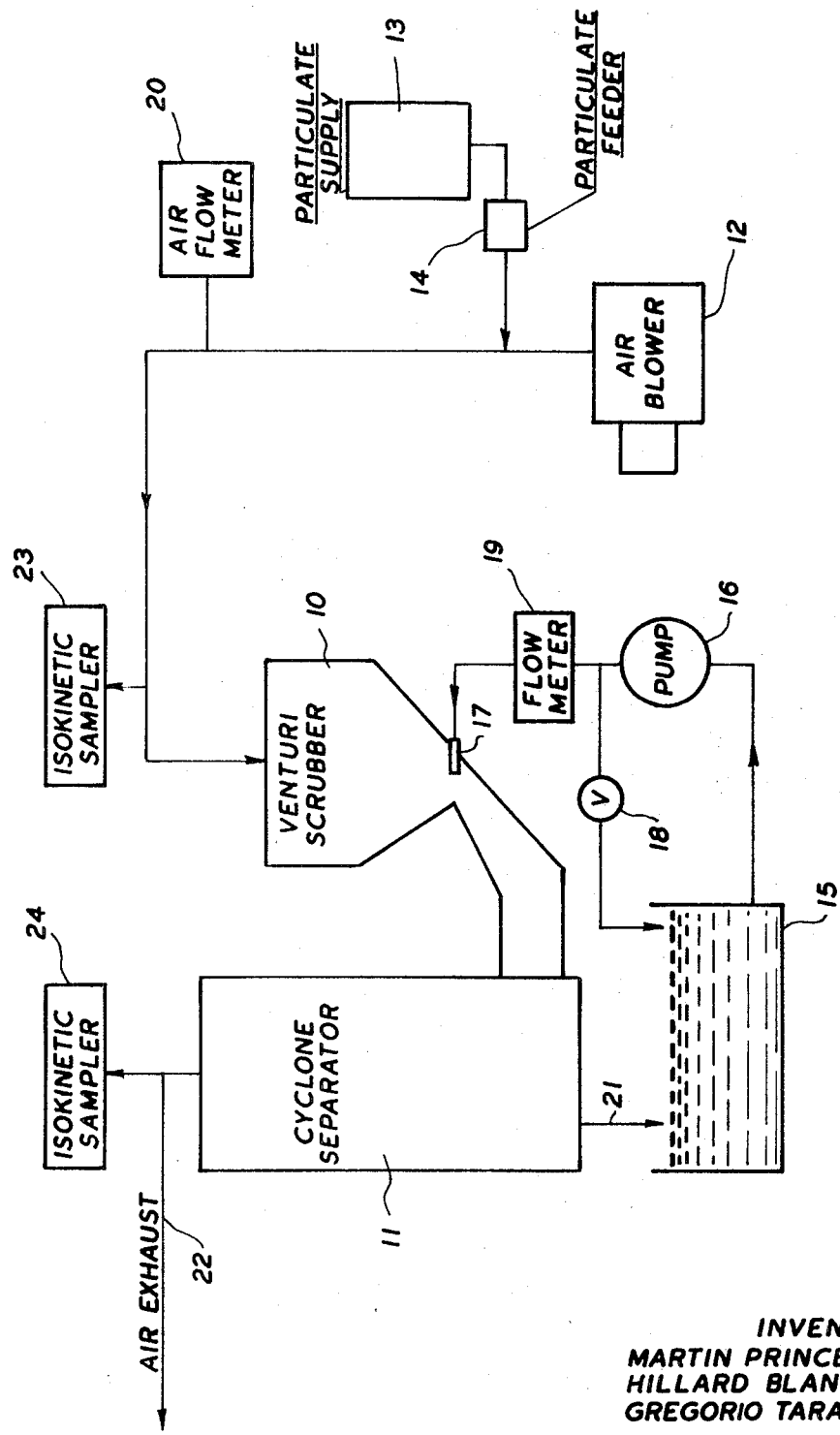

REMOVAL OF PARTICULATE MATTER FROM GASEOUS WASTES BY WET COLLECTORS

This invention relates generally to the removal of particulate matter from gaseous wastes by wet collectors, and is particularly directed to improving the effectiveness of the collection liquid used in such wet collectors for the removal of particulate matter from gaseous wastes.

Wet collectors of the types to which this invention relates are generally classified as chamber scrubbers, cyclonic scrubbers, inertial scrubbers and mechanical scrubbers, for example, as categorized in the report entitled "Removal of Particulate Matter from Gaseous Wastes", published 1961, by the American Petroleum Institute, 1271 Avenue of the Americas, New York, New York. In all of such wet collectors, the collection or scrubbing liquid is broken up into a spray which contacts the particle-laden gas, and the invention has particularly advantageous application to inertial scrubbers of the venturi scrubber type in which the energy of the particle-laden gas stream is primarily used to expand the surface area of the scrubbing liquid for effective contact.

In industrial venturi scrubbers, the particle-laden air or other gas is drawn or blown through the venturi, and the scrubbing liquid, usually water, is injected into, or just ahead of the venturi throat under low pressure and is distributed, as by a spray nozzle or nozzles or by weir boxes, to provide a curtain of the liquid across the throat where the gas velocity is high. In the venturi, the high velocity gas disrupts the liquid into drops which are rapidly accelerated, but since initially there is a high differential velocity between the drops and the particulate matter borne by the gas, collection by impaction takes place. The scrubbing liquid having the particulate matter entrapped therein is then separated from the cleaned gas, as in a cyclone separator. In the operation of venturi scrubbers, the liquid/gas flow rate ratio, the gas velocity and the pressure drop are among the operating conditions that may be varied. Generally speaking, an increase in the gas velocity achieves an increase in the particle collection efficiency, that is, in the percentage of the gas-borne particles that are collected by the scrubbing liquid. However, such an increase in the gas velocity is achieved at the cost of an increased power consumption for drawing or blowing the gas through the venturi. Further, there is an optimum range within which the liquid/gas flow rate ratio should reside for maximum particle collection efficiency. However, if the consumption of water used as the scrubbing liquid is to be minimized, it may be desirable to employ a liquid/gas flow rate ratio that is below the optimum range therefor.

It is an object of this invention to improve the particle collection by the scrubbing liquid in wet collectors, particularly of the venturi scrubber type, so as to make possible an increase in the particle collection efficiency, that is, an increase in the fraction of the gas-borne particles that are collected, or to permit a decrease in the power consumed for operation of the venturi scrubber, or in the quantity of water employed as the scrubbing liquid, for achieving a desired particle collection efficiency.

Another object is to improve particle collection by venturi scrubbers, as aforesaid, without requiring major changes or alterations in existing installations of such devices.

A further object is to provide improved particle collection by venturi scrubbers in an economically feasible manner.

Although there have been numerous studies of the mechanisms involved in the operation of venturi scrubbers, little or nothing has been previously learned with respect to the characteristics of the scrubbing liquid that importantly affect the particle collection in venturi scrubbers. Accordingly, the experimental and theoretical investigations leading to the present invention have involved studies of the influence on particle collection in wet collectors, and particularly in venturi scrubbers, of various characteristics of the scrubbing liquid. Since water is the most readily available and cheapest of liquids suitable for use as the scrubbing liquid, the mentioned investigations have been mainly concerned with the possibility of modifying characteristics of water, as by including additives therein in economically feasible amounts, so as to improve the particle collection by wet collectors, especially of the venturi scrubber type.

In the operation of low energy devices for removing gas-borne particles by washing, for example, in the operation of spray towers, it has been suggested to add wetting agents or surfactants to the spray water with the expectation that the resulting reduced surface tension of the relatively large spray droplets obtained in such low-energy devices will facilitate the contact of fine particles with such droplets.

However, it has been found that, when wetting agents or surfactants are added to the water used as the scrubbing liquid in venturi scrubbers, which are so-called high-energy devices, the addition of surfactants may or may not increase the particle collection efficiency and, surprisingly, may even result in a reduction of the particle collection efficiency.

We have found that particle collection by wet collectors, particularly of the venturi scrubber type, can be substantially improved beyond the levels previously considered possible, particularly with small particulate loadings in the gaseous wastes being treated, by employing, as the scrubbing liquid, water with economically feasible quantities of selected additives dissolved therein which may not substantially affect the surface tension of the liquid. More particularly, the additives dissolved in water to constitute the scrubbing liquids employed in accordance with this invention constitute mixtures of an alkyl or dialkyl-phenyl polyethoxy alcohol, an N-substituted ethoxy amide and an ethoxylated fatty alcohol. In such mixtures, the ethoxylated fatty alcohol may comprise from ½ to 40 wt.% of the mixture, and preferably from 1 to 30 wt.% of the mixture, while the alkyl or dialkyl-phenyl polyethoxy alcohol and the N-substituted ethoxy amide are preferably present in the mixture in approximately equal molar amounts and preferably each comprise at least 35 wt.% of the mixture. The amount of the described additive in the water may vary over a wide range, for example, from at least 5 p.p.m. to as much as 5000 p.p.m. and is preferably in the range from 50 to 1000 p.p.m.

The preferred alkylphenyl polyethoxy alcohols employed are those having the formula:

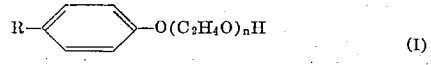

(I)

in which R represents $C_{8-9}H_{17-19}$ or $C_{12}H_{25}$ and $n$ has the numerical value of 4–12. Among commercially available alkylphenyl polyethoxy alcohols coming within the above definitions are: Igepal RC-520 (R = $C_{12}H_{25}$ and $n$=8-9), Igepal CO-530 (R = $C_9H_{19}$ and $n$=6) and Igepal CO-630 (R = $C_9H_{19}$ and $n$=9) available from GAF Corp., New York, N.Y.,; Hyonic PE-120 (R = $C_9H_{19}$ and $n$=12) available from Nopco Chemical Div. of Diamond Shamrock Chemical Co., Newark, N.J.; Triton X-45 (R = $C_8H_{17}$ and $n$=5) and Triton N-57 (R = $C_9H_{19}$ and $n$=5) available from Rohm & Hass Co., Philadelphia, Pa.; and Neutronyx 626 (R=$C_9H_{19}$ and $n$=6) and Neutronyx 622 (R= $C_9H_{19}$ and $n$=4) available from Onyx Chemical Corp., Jersey City, New Jersey.

Among the preferred dialkylphenyl polyethoxy alcohols are those available commercially under the tradename Igepal DM430, DM530 and DM710 from the GAF Corp.

The preferred N-substituted acid amides employed are those having the formulas:

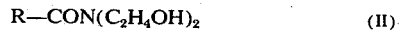

in which R—CO represents the acyl groups of coconut, lauric, methyl lauric or myristic acids or mixtures thereof; and

in which R—CO represents the acyl group of coconut, oleic, palmitic, tall oil or tallow acids, and $R_1$ represents a methyl or cyclohexyl group.

Among commercially available N-substituted amides of fatty acids coming within the definition of formula II are: Super Amide GR (R—CO = coconut acid) Super Amide L9 (R-CO = Lauric acid) and Super Amide L9C (R—CO = methyl lauric acid) available from Onyx Chemical Corp.; Syntol L-90 (R—CO = lauric acid) and Syntol LM-90 (R—CO = lauric and myristic acids) available from Drew Chemical Corporation, New York, N.Y.; and Hyonic LA-90 (R—CO = lauric acid) available from Nopco Chem. Div. of Diamond Shamrock Chemical Co.

Among commercially available N-substituted amides of fatty acids coming within the definition of formula III are:

Igepon T-73 (R—CO = oleic acid and $R_1$ = methyl), Igepon TK-32 (R—CO = tall oil acid and $R_1$ = methyl) and Igepon CN-42 (R—CO = palmitic acid and $R_1$ = cyclohexyl) available from GAF Corp.

The preferred ethoxylated fatty alcohols are the terminated ethoxylated linear alcohol available under the tradename DG-16 from Rohm & Hass, the ethoxylated tridecyl alcohol $[CH_3(CH_2)_{11}CH_2O(CH_2CH_2O)_4H]$ available under the tradename Lipal 3TD from Drew Chemicals Corp., the polyethoxylated fatty alcohols available under the tradenames Emulphor ON870 and ON877 and Diazopon SS-837 from GAF Corp., and the tridecyloxypoly (ethyleneoxy) ethanol also available from GAF Corp. under the tradename Emulphogene BC-840.

The most desirable mixtures appear to be those containing approximately 49% Neutronyx 622 or Igepal RC 520, 49% Igepon TK-32, and 2% Emulphor ON-870.

Further, if desired, antifoaming agents, such as Dow-A, -B, -C and H-10, available from the Dow-Corning Corp., Midland, Mich., and G.E. 60, available from the Silicone Products Department, General Electric Corp., Waterford, N.Y., may also be included in the additive having, as its essential constituent, a mixture of an alkylphenyl polyethoxy alcohol, an N-substituted acid amide and an ethoxylated fatty alcohol, as described above. The concentration of such antifoaming agents may be in the range from 5 to 500 p.p.m.

The single view of the drawing schematically illustrates a venturi scrubber system that has been employed for determining the effectiveness of various scrubbing liquids in removing particulate matter from gaseous wastes.

As shown, the venturi scrubber system generally comprises a venturi scrubber 10 connected with a cyclone separator 11. A centrifugal blower 12 equipped with a damper for varying the air flow rate has its outlet connected with the inlet to scrubber 10 and the air thus delivered to the scrubber has particulate matter added thereto from a supply 13 by way of a variable speed powder feeder 14. The scrubbing liquid is contained in a tank 15 and is pumped therefrom by a pump 16 for discharge into scrubber 10 at one or more nozzles or weir boxes 17. The liquid flow rate is controlled by a valve 18 interposed in a by-pass extending from the outlet of pump 16 back to tank 15. A flow meter 19 measures the liquid flow rate to scrubber 10, and an airflow meter 20, for example, in the form of a pitot tube and associated manometer, measures the air flow rate to the scrubber. The venturi scrubber 10, for test purposes, is provided with a variable area throat and with suitable instrumentation for measuring the pressure drop across such throat. The liquid and particulate matter entrapped thereby are returned from separator 11 to tank 15 by way of return line 21, while the air and any particulate matter that is still carried thereby are exhausted from separator 11 through an exhaust duct 22. Isokinetic sampling units 23 and 24 of conventional construction are connected respectively to the line or duct carrying air laden with particulate matter to scrubber 10 and to exhaust duct 22 for measuring the particulate loading of the air or gas before and after the treatment thereof in venturi scrubber 10 and cyclone separator 11.

The invention will now be further described with reference to the following illustrative examples employing a venturi scrubber system as described above.

EXAMPLE 1

The described venturi scrubber system was operated with a scrubbing liquid consisting of water with 100 p.p.m. of an additive constituted by a mixture of Triton X-45, Super Amide GR and DF-16 in proportions of 5:4:1, by weight. When the constituents of such additive were mixed together a reaction apparently occurred, as evidenced by a rise in temperature and change in pH. The particulate matter was a powdered limestone (97% calcium carbonate) available commercially under the tradename Vicron 25-11 from Pfizer, Minerals, Pigments and Metals Division, and was added to the air flow by feeder 14 so as to provide an inlet load of 32.4 grains of limestone/cu. ft. air as measured by sampler 23. The outlet loading of the air, that is, the amount of limestone, in grains/cu.ft.air, retained by the air in exhaust duct 22 was measured by sampler 24 for each run of the scrubber. The venturi scrubber was operated with various pressure drops and various air flow and water flow rates, as indicated in the below Table I, and, for each combination of operating conditions, runs were conducted with water alone as the scrubbing liquid and also with water and 100 p.p.m. of the additive as the scrubbing liquid for comparison purposes. The results of these tests were as follows:

TABLE I

| Air flow (cu. ft./sec.) | Water flow (gal./min.) | Pressure drop (inches) | Efficiency, percent (a) | | Relative improvement, percent (b) |
|---|---|---|---|---|---|
| | | | Water alone | With additive | |
| 2.52 | 1 | 7 | 96.4 | 97.6 | 50.0 |
| 2.52 | 2 | 8.5 | 96.7 | 97.8 | 50.0 |
| 2.52 | 3 | 10.5 | 97.9 | 98.6 | 50.0 |
| 5.04 | 1 | 8.0 | 96.2 | 97.4 | 50.0 |
| 5.04 | 2 | 9.0 | 96.5 | 97.7 | 52.2 |
| 2.52 | 1 | 16.0 | 97.4 | 98.4 | 62.5 |
| 2.52 | 1 | 17.0 | 97.6 | 98.65 | 78.0 | a. The values of efficiency given above were calculated as follows:

$$\text{Efficiency (percent)} = \frac{\text{Inlet load} - \text{Outlet load}}{\text{Inlet load}} \times 100$$

b. The values of relative improvement given above were calculated as follows:

Relative improvement (percent)
$$= \frac{\text{Efficiency (with add.)} - \text{Efficiency (water alone)}}{100 - \text{Efficiency (with add.)}} \times 100$$

In order to demonstrate that the above indicated very substantial relative improvements in the efficiency of collection of the particulate matter is the result of the use of an additive which, in accordance with this invention, is constituted by a reactive mixture of an alkylphenyl polyethoxy alcohol, an N-substituted amide of a fatty acid and an ethoxylated fatty alcohol, and that such large relative improvements are not attainable with only one of those constituents of the additive, the test runs indicated in Table I were repeated while using, as the scrubbing liquid, water having 100 p.p.m. of Triton X-45 dissolved therein. The results of these comparative tests are as follows:

TABLE II

| Air flow (cu.ft./sec.) | Water flow (gal./min.) | Pressure drop (inches) | Efficiency, percent | | Relative improvement, percent |
|---|---|---|---|---|---|
| | | | Water alone | With Triton X-45 | |
| 2.52 | 1 | 7.0 | 96.5 | 97.4 | 34.6 |
| 2.52 | 2 | 9.0 | 96.6 | 97.5 | 36.0 |
| 2.52 | 3 | 10.0 | 97.6 | 98.0 | 20.0 |
| 5.04 | 1 | 8.0 | 96.1 | 97.0 | 30.0 |
| 5.04 | 2 | 9.0 | 96.5 | 97.2 | 25.0 |
| 2.52 | 1 | 16.0 | 97.4 | 98.2 | 44.5 |
| 2.52 | 1 | 17.0 | 97.6 | 98.5 | 60.0 |

It will be apparent from the above that, under all the tested operating conditions, the relative improvement in the collection of particulate matter was substantially greater when using the combination or mixture of Triton X–45, Super Amide GR and DF–16 as the additive, than when using only Triton X–45 as the additive. Such improvement in the collection of particulate matter cannot be attributed to any difference between the surface active properties of the mixture or combination and of Triton X–45, as the surface tension of water containing 100 p.p.m. of Triton X–45 was measured to be 31.5 dynes/cm., and the surface tension of water containing 100 p.p.m. of the mixture of Triton X–45, Super Amide GR and DF–16 was measured to be 31.7 dynes/cm.

EXAMPLE 2

In order to further demonstrate that the particularly high collection efficiencies are attained only with an additive that is a mixture of an alkylphenyl polyethoxy alcohol (Triton X–45), an N-substituted amide of a fatty acid (Super Amide GR) and an ethoxylated fatty alcohol (DF–16), the venturi scrubber was operated with the additive according to this invention under operating conditions as described in Example 1 (air flow=5.04 cu.ft/sec., water flow=1 gal/min., pressure drop=13 in.) providing a collection efficiency of 97.4 percent when using water alone, and also with additives in which one of the constituents of the mixture according to this invention was omitted without reducing the total concentration of additive in the water. The results of these tests are given in the table below:

EXAMPLE 3

In order to demonstrate that the three constituents included in the additive according to this invention should be preferably selected to react with each other, numerous combinations of various alkylphenyl polyethoxy alcohols identified in column A of Table IV below, various N-substituted ethoxy amides of fatty acids identified in column B and various ethoxylated fatty alcohols identified in column C were mixed together in test tubes in the proportion 5:4:1 and were observed for evidence of reaction therebetween at room temperature. A reaction was considered to be evidenced by temperature change (either endothermic or exothermic), or changes in pH or in color and/or cloudiness. Of the various combinations thus tested, sixteen combinations showing no reaction and twenty-two combinations giving evidence of reaction were selected for use as additives to the water used as the collection liquid in the venturi scrubber, with the concentration of each additive being 100 p.p.m. In all of the tests indicated in Table IV below, the particulate matter to be removed was limestone (Vicron 25–11) fed at the same rate as Example 1, and the operating conditions of the scrubber were Air flow = 2.52 cu.ft/sec, water flow = 1 gal./min., and pressure drop = 7 in. water, which results in an efficiency of 96.4% when using water alone.

The results of these tests were as follows:

TABLE IV

| A | B | C | Reaction | Efficiency, percent | Relative improvement, percent |
| --- | --- | --- | --- | --- | --- |
| Triton X–45 | Super Amide GR | DF–16 | Yes | 97.6 | 50.0 |
| Do | Super Amide L9 | DF–16 | Yes | 97.7 | 56.5 |
| Triton X–114 | Super Amide LM | DF–16 | No | 97.0 | 20.0 |
| Triton X–15 | do | DF–16 | No | 96.8 | 12.5 |
| Triton X–45 | do | DF–16 | No | 97.1 | 24.2 |
| Do | Super Amide L9C | DF–16 | No | 97.0 | 20.0 |
| Triton X–100 | Super Amide L9 | DF–16 | No | 97.0 | 20.0 |
| Triton N–101 | do | DF–16 | No | 97.0 | 20.0 |
| Triton X–100 | Super Amide LM | DF–16 | No | 97.0 | 20.0 |
| Triton X–45 | Syntol LM–90 | DF–16 | Yes | 97.6 | 50.0 |
| Triton N–57 | do | DF–16 | Yes | 97.6 | 50.0 |
| Triton X–45 | Syntol CN–60 | DF–16 | No | 97.0 | 20.0 |
| Triton N–57 | do | DF–16 | No | 96.9 | 16.1 |
| Do | Syntol L–90 | DF–16 | Yes | 97.8 | 63.6 |
| Triton X–45 | do | DF–16 | Yes | 98.1 | 89.0 |
| Do | Super Amide L9 | Lipal 4LA | No | 97.2 | 29.6 |
| Triton N–57 | do | do | No | 97.2 | 29.6 |
| Triton X–45 | do | Lipal 3TD | Yes | 98.1 | 89.0 |
| Triton N–57 | do | do | Yes | 97.6 | 50.0 |
| Triton X–45 | do | Lipal 2–OA | No | 97.2 | 29.6 |
| Triton N–57 | do | Lipal 4C3A | No | 97.3 | 33.4 |
| Triton X–45 | do | do | No | 97.2 | 29.6 |
| Triton N–57 | do | Lipal 2–OA | No | 97.4 | 38.5 |
| Hyonic PE–120 | Igepon T–73 | Emulphor ON–870 | Yes | 98.4 | 125.0 |
| Triton X–45 | do | do | Yes | 97.8 | 63.7 |
| Triton N–57 | do | do | Yes | 98.4 | 125.0 |
| Neutronyx 626 | do | do | Yes | 97.6 | 50.0 |
| Neutronyx 622 | do | do | No | 97.2 | 28.6 |
| Triton X–45 | Igepon TK–32 | do | Yes | 98.0 | 80.0 |
| Neutronyx 622 | do | do | Yes | 98.5 | 140.0 |
| Triton N–57 | Igepon CN–42 | do | Yes | 98.0 | 80.0 |
| Hyonic PE–120 | Igepon TK–32 | do | Yes | 98.4 | 125.0 |
| Do | Hyonic LA–90 | do | Yes | 98.2 | 100.0 |
| Igepal RC–520 | Igepon TK–32 | do | Yes | 98.4 | 125.0 |
| Neutronyx 622 | do | Lipal 3TD | Yes | 98.2 | 100.0 |
| Do | do | Diazopon SS–837 | Yes | 98.5 | 140.0 |
| Do | do | Emulphogene BC–840 | Yes | 98.5 | 140.0 |
| Do | Super Amide GR | Emulphor ON–870 | Yes | 98.2 | 100.0 |

TABLE III

| Concentration of Additive Constituent in p.p.m. | | | Efficiency % | Relative Improvement % |
| --- | --- | --- | --- | --- |
| Triton X–45 | Super Amide GR | Df–16 | | |
| 50 | 40 | 10 | 98.4 | 62.5 |
| 50 | 50 | 0 | 98.0 | 30.0 |
| 50 | 0 | 50 | 97.9 | 23.8 |
| 0 | 50 | 50 | 98.0 | 30.0 |

From the above, it will be apparent that the relative improvement achieved when any one of the three constituents of the additive according to this invention is omitted is at least less than one-half that attained with the additive containing all three constituents.

The constituents referred to in columns A, B and C above have been previously further identified or are further identified as follows:

Triton X–15, Triton X–100, Triton X–114 and Triton N–101 are commercially available products of Rohm & Haas Co., Philadelphia, Pa., of the general formula (I) and in which R and n respectively represent $C_8H_{17}$ and 1; $C_8H_{17}$ and 9–10; $C_8H_{17}$ and 7–8; and $C_9H_{19}$ and 9–10.

Super Amide LM is a commercially available product of Onyx Chemical Corp. of the general formula (II) in which R is methyl lauric/myristic acid.

Syntol CN–60 is a commercially available product of Drew Chemical Corp. of the general formula (II) in which R is coconut acid.

Lipal 4LA, Lipal 2–OA, and Lipal 4C3A are commercially available products of Drew Chemicals Corp. and are respectively ethoxylated lauryl alcohol [$CH_3(CH_2)_{10}CH_2O(CH_2CH_2O)_5H$], ethoxylated oleyl alcohol [$CH_3(CH_2)_7CH=CH(CH_2)_8O(CH_2CH_2O)_{21}H$], and ethoxylated cetyl/stearyl alcohol [$CH_3(CH_2)_{14-16}CH_2O(CH_2CH_2O)_5H$].

It is apparent from the results given in Table IV above that those 16 combinations which did not give evidence of reacting upon mixing of the three constituents thereof provided relative improvements in the range from 12.5 to 38.5 percent, whereas the 22 combinations which gave evidence of reacting provided relative improvements in the range from 50.0 to 140.0 percent.

EXAMPLE 4

The tests of Example 3 were repeated as to the combination of Neutronyx 622, Igepon TK–32 and Emulphor ON–870 shown in Table IV to provide the largest relative improvement, but with the relative amounts of the three constituents being varied, and the relative amounts of the three constituents and the results for each of these were as follows:

TABLE V

| Neutronyx 622 | Additive (ppm) Igepon TK–32 | Emulphor ON–870 | Efficiency % | Relative Improvement % |
| --- | --- | --- | --- | --- |
| 50 | 40 | 10 | 98.5 | 140 |
| 40 | 50 | 10 | 98.3 | 112 |
| 40 | 10 | 50 | 97.4 | 40 |
| 10 | 40 | 50 | 95.6 | –18 |
| 85 | 5 | 10 | 97.6 | 50 |
| 5 | 85 | 10 | 97.6 | 50 |
| 10 | 5 | 85 | 95.4 | –22 |
| 35 | 35 | 30 | 98.0 | 80 |
| 48.5 | 48.5 | 2 | 98.6 | 157 |

From the results given in Table V, it is apparent that nearly equal amounts of Neutronyx 622 and Igepon TK–32, and low concentrations of Emulphor ON–870 give the best results, and further that large amounts of Emulphor ON–870 are detrimental, that is, will reduce the collection efficiency below that (96.4 percent) attainable with water alone as the scrubbing liquid. Further, the effectiveness of only 2 percent of Emulphor ON–870 in the additive resulting in the highest relative improvement of 157 percent indicates that such constituent acts either as a "catalyst" or as coupling agent for the other two constituents although the precise nature of the reaction or interaction is not understood.

EXAMPLE 5

Four additive combinations which gave the best results with calcium carbonate as the particulate matter were employed in tests using fly ash particulate matter. The fly ash used was obtained from the New York City incinerator located on Newtown Creek in Brooklyn, N.Y. Since this incinerator has no particulate collection system other than a settling chamber, some of the fly ash was of such large particle size that is was necessary to screen it through a No. 10 sieve prior to use in the venturi scrubber. The particle size analysis of the fly ash after such screening was as follows:

| Sieve No. | Microns | Wt. % Retained on Sieve |
| --- | --- | --- |
| 10 | 2000 | 0 |
| 20 | 841 | 1.00 |
| 25 | 707 | 2.67 |
| 35 | 505 | 7.00 |
| 50 | 297 | 20.0 |
| 60 | 250 | 7.5 |
| 80 | 177 | 19.5 |
| 120 | 125 | 14.0 |
| 140 | 105 | 7.0 |
| 200 | 74 | 9.33 |
| smaller | | 12.0 |

Based on the report "Refuse Composition and Flue Gas Analyses from Municipal Incinerators", by E.R. Kaiser, Proc. Nat'l Incinerator Conf., American Soc. of Mech. Engineers, 35–51 (1964), which dealt with analysis of the fly ash collected in the settling chamber and emitted through the stack of three New York City incinerators, it may be assumed that the fly ash used in this example had approximately the following composition:

| | wt. % |
| --- | --- |
| Silicon as $SiO_2$ | 49.5 |
| Aluminimum as $Al_2O_3$ | 22.9 |
| Iron as $Fe_2O_3$ | 6.3 |
| Calcium as CaO | 8.8 |
| Magnesium as MgO | 2.2 |
| Sodium as $Na_2O$ | 6.0 |
| Potassium as $K_2O$ | |
| Titanium as $TiO_2$ | 1.3 |
| Sulfur as $SO_3$ | 3.0 |

From the above it is apparent that the materials present were in the form of metal oxides, with silicon dioxide and aluminum oxide being the major components.

The operating conditions of the venturi scrubber were:
Air Flow – 2.52 cu.ft./sec.
Water Flow – 1 gal/min.
Throat Opening – 0.5 in.
Pressure Drop – 7 inches $H_2O$
Feed Rate of Fly Ash – 200 grams/min.

The above operating conditions resulted in a collection efficiency of 97.7 percent when using water alone as the scrubbing liquid. The compositions of the four additive combinations and the results thereof were as follows:

TABLE VI

| Additive Composition (ppm) | Collection Efficiency % | Relative Improvement % |
| --- | --- | --- |
| Hyonic PE–120 (50) Igepon T–73 (40) Emulphor ON–870 (10) | 98.0 | 15.0 |
| Neutronyx 622 (50) Igepon TK–32 (40) Emulphor ON–870 (10) | 98.8 | 92.0 |
| Triton N–57 (50) Igepon T–73 (40) Emulphor ON–870 (10) | 98.7 | 77.0 |
| Hyonic PE–120 (50) Igepon TK–32 (40) Emulphor ON–870 (10) | 98.3 | 35.4 |

From the above it will be apparent that the additive combination of Neutronyx 622, Igepon T–73 and Emulphor ON–870 which gave the best results with limestone also gave the best results with fly ash.

All of the additive combinations contained, as the major component, a nonylphenyl polyethylene oxide alcohol, that is, Hyonic PE–120 which has 12 polyethylene oxide groups, Neutronyx 622 which has 4 polyethylene oxide groups or Triton N–57 which has 5 polyethylene oxide groups. The additive combinations containing Neutronyx 622 and Triton N–57, with 4 and 5 polyethylene oxide groups, respectively, gave the best results and, therefore, particular preference is to be given to additive combinations in which the alkylphenyl polyethoxy alcohol thereof has a number of alkylene oxide groups in the lower half of the range of 4–12 groups.

The relative improvement in the collection of fly ash resulting from the use of the most efficacious additive indicated by Table VI can have important significance in the reduction of air pollution by emissions from refuse incinerators. If it is reasonably assumed that, in achieving the overall collection efficiency of 96.4 percent with water alone as the scrubbing liquid, the venturi scrubber had a 100 percent collection efficiency in respect to particles larger than 74 microns, then the collection efficiency as to particles smaller than 74 microns was 80.8 percent. These smaller particles would be representative of the fly ash emitted through the stack of the incinerator. The increase of the overall collection efficiency to 98.8 percent through the use of the additive constituted by Neutronyx 622, Igepon TK-32 and Emulphor ON-870, would thus represent an increase of the collection efficiency to 90 percent in respect to particles smaller than 74 microns. Available information indicates that, in the case of an incinerator without a collection device, the emissions to the atmosphere are about 17 lbs. per ton of refuse burned. The provision of such an incinerator with a venturi scrubber using water alone as the scrubbing liquid would reduce the emissions to the atmosphere to about 3.3 lbs/ton of refuse, and the use of water with the additive according to this invention would further reduce the emissions to the atmosphere to 1.6 lbs/ton of refuse.

EXAMPLE 6

The venturi scrubber was operated with water alone as the scrubbing liquid, and with water and 100 p.p.m. of the additive constituted by Neutronyx 662, Igepon TK-32 and Emulphor ON-870 in the ratio 5:4:1 as the scrubbing liquid, at various air flow rates and pressure drops, to determine the respective collection efficiencies in respect to the municipal fly ash described in Example 5. The water flow rate was maintained constant at 1.0 gal/min. for all of the tests, and the results of such tests were as follows:

TABLE VII

| Scrubbing Liquid | Pressure Drop (in.) | Air flow (cu.ft./sec.) | Efficiency (%) |
| --- | --- | --- | --- |
| Water alone | 7 | 2.52 | 97.7 |
| Water alone | 17.5 | 2.52 | 98.8 |
| Water + additive | 7 | 2.52 | 98.8 |
| Water + additive | 4.5 | 2.52 | 97.7 |
| Water + additive | 5.7 | 3.17 | 97.7 |
| Water + additive | 10.5 | 4.20 | 98.8 |

The results appearing in the above table indicate a number of the advantages accruing from the use of the additive according to this invention. In existing installations, where the efficiency obtainable using only water as the scrubbing liquid is satisfactory, use of the additive will allow the system to be operated at a lower pressure drop. This will result in a power saving.

If greater air or gas handling capacity is required from existing equipment, use of the additive will enable the venturi to maintain the efficiency at the same pressure drop through the equipment. This would be useful where existing equipment is overloaded and would save the capital and operating expense of an additional system.

In those systems that do not provide the required scrubbing efficiency use of the additive would result in increased efficiency.

In designing new venturi installations, if the efficiency improvement is considered as part of the overall design and a system is developed with the additive as a part of the scrubbing liquid, then the overall capital and operating costs will be lower. This results from a lower pressure drop required through the equipment, which produces a lower blower cost and a smaller power cost to operate it. In addition, because of the lower pressure drop, there would be lower maintenance costs and longer equipment life because of less erosion in the throat.

Even in low energy scrubbers an increase in efficiency would result by using the additive. In addition, for poorly wettable particulates, an even greater increase in efficiency can be expected, since the additive exhibits surface active properties.

To get a quantitative idea of the annual operating costs of a venturi scrubbing system, use can be made of the expression developed by the National Air Pollution Administration. This is presented on page 163 of "Control Techniques for Particulate Air Pollutants."

$$G = S\left[0.7457 HK\left(\frac{P}{6356E} + \frac{Qg}{1722F} + \frac{Qh}{3960F}\right) + WHL + M\right] \quad (IV)$$

Where:
- $G$ = Annual cost of operation and maintenance for Venturi Scrubbers
- $S$ = Design capacity of system, acfm.
- $H$ = Annual operating time, hrs.
- $K$ = Power cost, dollars per kilowatt hr.
- $P$ = Pressure drop across fan, inches of water
- $Q$ = Liquor Circulation, gallons per acfm.
- $g$ = Liquor pressure at venturi, psig.
- $h$ = Height liquor is pumped in system, ft.
- $W$ = Liquor consumption, gallons per acfm.
- $L$ = Liquor cost, dollars per acfm.
- $M$ = Maintenance cost, dollars per acfm.
- $E$ = Fan efficiency
- $F$ = Pump efficiency This equation is simply a statement that the annual cost is the sum of the costs for fan power, water pumping, water atomization, water consumption, and maintenance.

An idea of the costs for an actual system can be derived from data published with respect to the system that is installed on the Department of Sanitation incinerator at 73rd Street and FDR Drive in New York City. The parameters are:

| | |
| --- | --- |
| $S$ = 147,000 acfm. | $h$ = 30 ft. (approx.) |
| $H$ = 8760 hrs. | $W$ = 0.0017 gal./hr./acfm. |
| $K$ = $0.011/KW hr. | $L$ = $0.0005 per gal. |
| $P$ = 13 inches water | $M$ = $0.04/acfm (typical) |
| $Q$ = 0.01 ga./acfm (assumed) | $E$ = 0.60 |
| $g$ = 10 psig (assumed) | $F$ = 0.50 |

For the case where no additive is used the costs would be:

| | |
| --- | --- |
| Fan Cost | = $35,900 |
| Water Pumping & Atomizing | = 2,829 |
| Water Consumption | = 698 |
| Maintenance | = 5,880 |
| Yearly Operating Cost | = $45,298 |

It is apparent from the above that the major factor in the annual operating cost is that due to the power required to pump the gas or air through the venturi scrubber. In the actual example given, this power cost is 79 percent of the total annual cost. If it is assumed that it is desired to operate with a collection efficiency of 98.8 percent, the results in Table VII show that, in the case of water alone, such efficiency is attained with a pressure drop of 17.5 inches $H_2O$. However, when using the additive according to this invention, the same efficiency can be obtained with a pressure drop of only 7 inches $H_2O$, that is, $P$ in equation IV is reduced by 60 percent, and therefore the power cost for pumping the air or gas is also reduced by 60 percent.

Taking the values given above for the New York City Department of Sanitation incinerator, which presently operates with a pressure drop of 13 inches $H_2O$ at a power cost for pumping air of $35,900 per year, it is apparent that a 34.6 percent increase in the pressure drop to 17.5 inches $H_2O$ would involve a power cost increase to about $48,300. Therefore, a 60 percent saving in such power cost as a result of the use of the additive according to this invention would represent a saving of about $30,000. Since the cost of the indicated additive is about fifty cents per pound, the additive cost would be about $570 per year, assuming recirculation of the liquid, with a resultant net saving of about $29,400.

If the venturi system is designed to take advantage of the ability of the additive to allow operation at a lower pressure drop, capital equipment savings could also be gained. In the above case, while the blower size would be about the same, the motor necessary to drive it would be smaller. For the mentioned incinerator the blower requires a 500 HP motor costing about $7,200. With additive, a 300 HP motor would be needed at a cost of about $5,000.

Although the economies resulting from use of an additive according to this invention have been specifically indicated with reference to the operation of a venturi scrubber for removing fly ash from the waste gases of an incinerator, similar economies will be achieved through the use of such additive in connection with venturi scrubbers applied to lime kilns and steel-making furnaces, in which cases the power for pumping the gases through the venturi scrubber is respectively 70 percent and 87 percent of the annual cost of operation.

EXAMPLE 7

The venturi scrubber was run with various pressure drops, various inlet loadings of limestone (Vicron 25-11) and various air and water flow rates, using water alone as the scrubbing liquid and using water with one of the following additives in various concentrations:

$X$ = 49% Triton N-57, 49% Igepon T-73, 2% Emulphor ON-870;
$Y$ = 49% Neutronyx 622, 49% Igepon TK-32, 2% Emulphor ON-870;
$Z$ = 50% Neutronyx 622, 50% Igepon TK-32.

The conditions and results of such tests were as follows:

TABLE VIII

| Scrubbing liquid | Additive concentration (p.p.m.) | Air flow (cu. ft./sec.) | Water flow (gal./min.) | Pressure drop (in. H₂O) | Inlet load (grains/ft.³) | Collection efficiency percent |
|---|---|---|---|---|---|---|
| H₂O | 0 | 2.52 | 1.0 | 7 | 32.4 | 96.4 |
| H₂O | 0 | 2.52 | 1.0 | 15 | 32.4 | 97.2 |
| H₂O | 0 | 5.04 | 2.0 | 15 | 16.2 | 97.5 |
| H₂O | 0 | 2.52 | 1.0 | 31 | 32.4 | 98.95 |
| H₂O+X | 10 | 2.52 | 1.0 | 7 | 32.4 | 97.5 |
| H₂O+X | 100 | 2.52 | 1.0 | 7 | 32.4 | 98.5 |
| H₂O+X | 1,000 | 2.52 | 3.0 | 7 | 32.4 | 98.8 |
| H₂O+X | 333 | 2.52 | 1.0 | 7 | 32.4 | 98.85 |
| H₂O+Y | 10 | 2.52 | 1.0 | 7 | 32.4 | 97.6 |
| H₂O+Y | 100 | 2.52 | 1.0 | 7 | 32.4 | 98.6 |
| H₂O+Y | 300 | 2.52 | 1.0 | 7 | 32.4 | 98.8 |
| H₂O+Y | 1,000 | 2.52 | 1.0 | 7 | 32.4 | 98.85 |
| H₂O+Y | 100 | 5.04 | 2.0 | 7 | 16.2 | 98.5 |
| H₂O+Y | 100 | 2.52 | 1.0 | 15 | 32.4 | 98.85 |
| H₂O+Y | 100 | 5.04 | 2.0 | 15 | 16.2 | 98.85 |
| H₂O+Z | 100 | 2.52 | 1.0 | 7 | 32.4 | 97.4 |

Once again, the last test listed above, that is, the test involving the use of additive $Z$ which omits the Emulphor ON-870 from additive $Y$, indicates the importance of all three constituents in the additive according to this invention. It will also be seen that, with as little as 10 p.p.m. of the additives $X$ and $Y$ according to the invention, it is possible to achieve collection efficiencies of 97.5 percent and 97.6 percent, respectively, with a pressure drop of 7 in. H₂O, whereas a comparable collection efficiency is attainable with water alone only by more than doubling the pressure drop and correspondingly increasing the power consumed.

EXAMPLE 8

The venturi scrubber was operated with reduced inlet loadings of limestone (Vicron 25-11) and at various pressure drops while keeping constant the air flow at 4.2 cu. ft/sec. and the water flow at 2.5 gal./min. The additive according to this invention used in certain of the runs in the amounts indicated was 49% Neutronyx 622, 49% Igepon TK-32 and 2 percent Emulphor ON-870, and the antifoam agent added to the scrubbing liquid in certain runs was Dow-C. The results of these tests were as follows:

TABLE IX

| Additive concentration (p.p.m.) | Antifoam concentration (p.p.m.) | Pressure drop (in H₂O) | Inlet load (grains/cu. ft.) | Efficiency (percent) |
|---|---|---|---|---|
| 0 | 0 | 5 | 3.3 | 91.9 |
| 0 | 0 | 10 | 3.3 | 95.0 |
| 0 | 0 | 15 | 3.3 | 97.2 |
| 0 | 0 | 20 | 3.3 | 98.1 |
| 300 | 0 | 5 | 3.3 | 92.3 |
| 300 | 0 | 10 | 3.3 | 96.6 |
| 300 | 0 | 15 | 3.3 | 98.7 |
| 300 | 0 | 20 | 3.3 | 99.3 |
| 0 | 0 | 7 | 5.5 | 93.4 |
| 300 | 0 | 7 | 5.5 | 93.7 |
| 0 | 0 | 5 | 10.9 | 93.6 |
| 0 | 0 | 10 | 10.9 | 96.1 |
| 0 | 0 | 15 | 10.9 | 97.5 |
| 0 | 0 | 20 | 10.9 | 98.7 |
| 300 | 0 | 5 | 10.9 | 94.0 |
| 300 | 0 | 10 | 10.9 | 97.8 |
| 300 | 0 | 15 | 10.9 | 98.8 |
| 300 | 0 | 20 | 10.9 | 99.5 |
| 300 | 10 | 5 | 10.9 | 94.3 |
| 300 | 10 | 10 | 10.9 | 97.9 |
| 300 | 10 | 15 | 10.9 | 98.9 |
| 300 | 10 | 20 | 10.9 | 99.5 |

EXAMPLE 9

In the tests of Example 8, the scrubbing liquid was not recirculated repeatedly, as would be the usual case in a practical commercial application of the invention. The result of such repeated recirculation of the scrubbing liquid would be the conversion of the latter to a slurry of the removed particulate matter (limestone) in the scrubbing liquid. In order to demonstrate the effect of repeated recirculation of the scrubbing liquid, the tests of Example 8 were repeated, but with the scrubbing liquid being a slurry containing 2 wt.% of limestone (Vicron 25-11). The results of these tests were as follows:

TABLE X

| Additive concentration (p.p.m.) | Antifoam concentration (p.p.m.) | Pressure drop (in H₂O) | Inlet load (grains/cu. ft.) | Efficiency (percent) |
|---|---|---|---|---|
| 0 | 0 | 5 | 10.9 | 93.5 |
| 0 | 0 | 10 | 10.9 | 95.9 |
| 0 | 0 | 15 | 10.9 | 97.3 |
| 0 | 0 | 20 | 10.9 | 98.5 |
| 0 | 0 | 25 | 10.9 | 98.8 |
| 300 | 0 | 5 | 10.9 | 94.1 |
| 300 | 0 | 10 | 10.9 | 97.6 |
| 300 | 0 | 15 | 10.9 | 98.6 |
| 300 | 0 | 20 | 10.9 | 99.3 |
| 300 | 0 | 25 | 10.9 | 99.4 |
| 0 | 0 | 5 | 3.3 | 91.6 |
| 0 | 0 | 10 | 3.3 | 94.9 |
| 0 | 0 | 15 | 3.3 | 97.0 |
| 0 | 0 | 20 | 3.3 | 98.1 |
| 300 | 0 | 5 | 3.3 | 91.9 |
| 300 | 0 | 10 | 3.3 | 96.3 |
| 300 | 0 | 15 | 3.3 | 98.4 |
| 300 | 0 | 20 | 3.3 | 99.2 |

EXAMPLE 10

The venturi scrubber was operated at various pressure drops and with iron oxide powder (Kroma Red available from Charles Pfizer & Co., New York, New York) as the particulate matter to be removed. Such iron oxide powder has a particle size distribution between about 0.5 and 4.0 microns, and closely resembles the particulate matter emitted from the stacks of commercial steel furnaces. The inlet loading was 5.7 grains/cu.ft. for all runs, and air flow and water flow rates were respectively 4.2 cu.ft.sec. and 2.5 gal./min. The scrubbing liquid was either water alone or water plus the below indicated amounts of the additive constituted by 49% Neutronyx 622, 49% Igepon TK-32 and 2 percent Emulphor ON-870. Further, in some instances, as indicated, the antifoam agent Dow-C was also added to the water. The results of these tests were as follows:

TABLE XI

| Additive concentration (p.p.m.) | Antifoam concentration (p.p.m.) | Pressure drop (in H₂O) | Efficiency, percent | Relative improvement, percent |
| --- | --- | --- | --- | --- |
| 0 | 0 | 10 | 95.0 | |
| 0 | 0 | 20 | 97.9 | |
| 0 | 0 | 30 | 99.2 | |
| 100 | 0 | 10 | 95.8 | 19.0 |
| 100 | 0 | 20 | 98.2 | 16.6 |
| 100 | 0 | 30 | 99.3 | 14.3 |
| 300 | 0 | 10 | 97.4 | 92.3 |
| 300 | 0 | 20 | 98.9 | 91.0 |
| 300 | 0 | 30 | 99.6 | 100.0 |
| 300 | 10 | 10 | 97.4 | 92.3 |
| 300 | 10 | 20 | 98.7 | 61.5 |
| 300 | 10 | 30 | 99.5 | 60.0 |

From the above, it will be apparent that the additive according to this invention, particularly when present in an amount of 300 p.p.m., effects a very substantial improvement in the efficiency with which the iron oxide powder is collected from the air stream.

EXAMPLE 11

The tests described in Example 10 were repeated, but with the scrubbing liquid being constituted by a slurry of 200 p.p.m. of the iron oxide powder in water either with or without the additive (49% Neutronyx 622, 49% Igepon TK-32 and 2% Emulphor ON-870) according to the invention and an antifoam agent. The use of the iron oxide slurry approximated the conditions in a commercial installation employing repeated recirculation of the scrubbing liquid. The results of these tests were as follows:

TABLE XII

| Additive concentration (p.p.m.) | Antifoam agent | Antifoam concentration (p.p.m.) | Pressure drop (in. H₂O) | Efficiency, percent | Relative improvement, percent |
| --- | --- | --- | --- | --- | --- |
| 0 | | 0 | 10 | 95.0 | |
| 0 | | 0 | 20 | 97.9 | |
| 0 | | 0 | 30 | 99.2 | |
| 100 | Dow-C | 50 | 10 | 97.1 | 72.5 |
| 100 | Dow-C | 50 | 20 | 98.7 | 61.5 |
| 100 | Dow-C | 50 | 30 | 99.5 | 60.0 |
| 300 | Dow-C | 50 | 10 | 97.6 | 108.2 |
| 300 | Dow-C | 50 | 20 | 99.0 | 110.0 |
| 300 | Dow-C | 50 | 30 | 99.6 | 100.0 |
| 1000 | Dow-C | 50 | 20 | 99.0 | 110.0 |
| 300 | Dow-C | 100 | 20 | 99.1 | 133.0 |
| 1000 | Dow-C | 100 | 20 | 99.1 | 133.0 |
| 300 | Dow-A | 15 | 20 | 99.0 | 110.0 |
| 300 | Dow H-10 | 50 | 20 | 98.8 | 75.0 |

EXAMPLE 12

The efficaciousness of a number of other additive combinations was determined with respect to the removal of iron oxide powder (Kroma Red). For all of these tests, the venturi scrubber was operated with an inlet loading of 5.7 grains/cu.ft., an air flow of 4.2 cu.ft./sec., a water flow of 2.5 gal./min, and a pressure drop of 20 in. H₂O. The scrubbing liquid, in each instance, consisted of a slurry of 200 p.p.m. of the iron oxide powder in water to which was added 300 p.p.m. of the particular additive and 50 p.p.m. of Dow-C. In each additive, the constituents indicated below in the columns headed A, B and C were present in the proportions, by weight, of 49:49:2. In the absence of any additive or antifoam agent, the slurry alone provided a collection efficiency of 97.9 percent. The results of these tests were as follows:

TABLE XIII

| Additive | | | Efficiency, percent | Relative improvement, percent |
| --- | --- | --- | --- | --- |
| A | B | C | | |
| Neutronyx 622 | Igepon TK-32 | Emulphogene BC-840 | 99.1 | 133 |
| Igepal RC-520 | do | Emulphor ON-870 | 99.3 | 200 |
| Neutronyx 622 | do | Emulphor ON-877 | 99.2 | 162 |
| Igepal DM 430 | do | Emulphor ON-870 | 99.2 | 162 |
| Igepal DM 530 | do | do | 99.1 | 133 |
| Igepal DM 710 | do | do | 99.2 | 162 |
| Igepal CO-530 | do | do | 99.2 | 162 |
| Igepal CO-630 | do | do | 99.3 | 200 |

From the foregoing examples, it will be seen that the use of additives according to this invention is effective to very substantially increase the collection efficiency of wet collectors as to a wide variety of particulate substances including, but not limited to, limestone (calcium carbonate), fly ash (composed chiefly of silicon dioxide and aluminum oxide) and iron oxide. Such improved collection efficiency makes possible the minimization of the air polluting emissions from industrial process apparatus, such as, lime kilns, refuse incinerators and steel furnaces, and/or the reduction of the operating and capital costs of the venturi scrubbers or other wet collectors associated with such apparatus.

What is claimed is:

1. A scrubbing liquid for a wet collection apparatus consisting essentially of water and an additive dissolved therein constituted by a mixture of an alkyl- or dialkyl- phenyl polyethoxy alcohol, an N-substituted acid amide and an ethoxylated fatty alcohol, said additive being present in said water in a concentration between approximately 5 and 5000 p.p.m.

2. A scrubbing liquid according to claim 1, in which said ethoxylated fatty alcohol constitutes approximately ½ to 40 wt.% of said mixture, and said alkyl- or dialkylphenyl polyethoxy alcohol and N-substituted acid amide are present in said mixture in approximately equal molar amounts.

3. A scrubbing liquid according to claim 2, in which each of said alkyl- or dialkylphenyl polyethoxy alcohol and said N-substituted acid amide constitutes at least 35 wt.% of said mixture.

4. A scrubbing liquid according to claim 1, in which said alkyl- or dialkylphenyl polyethoxy alcohol, N-substituted acid amide and ethoxylated fatty alcohol are selected to react with each other in said mixture.

5. A scrubbing liquid according to claim 4, in which said additive concentration is between approximately 50 and 1000 p.p.m.

6. A scrubbing liquid according to claim 4, in which said alkylphenyl polyethoxy alcohol has the formula

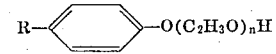

in which R is selected from $C_{8-9}H_{17-19}$ and $C_{12}H_{25}$ and $n$ has the numerical of 4 to 12, and said N-substituted acid amide is selected from substances having one of the below formulas $$R - CON(C_2H_4OH)_2$$

in which R—CO is selected from the group consisting of the acyl groups of coconut, lauric, methyl lauric and myristic acids, and mixtures thereof, and $$R-CON\overset{R_1}{\underset{|}{C}}H_2CH_2SO_3Na$$

in which R—CO is selected from the group consisting of the acyl groups of coconut, oleic, palmitic, tall oil and tallow acids, and $R_1$ is selected from the group consisting of methyl and cyclohexyl groups.

7. A scrubbing liquid according to claim 6, in which each of said alkyl- or dialkylphenyl polyethoxy alcohol and said N-substituted acid amide constitutes at least 35 wt.% of said mixture.

8. A scrubbing liquid according to claim 1, in which said water further contains an antifoaming agent in a concentration between approximately 5 and 500 p.p.m.

9. An additive for improving the particle collection efficiency of the scrubbing liquid in a wet collection apparatus, comprising a mixture of an alkyl- or dialkylphenyl polyethoxy alcohol, an N-substituted acid amide and an ethoxylated fatty alcohol.

10. An additive according to claim 9, in which said ethoxylated fatty alcohol constitutes approximately ½ to 40 wt.% of said mixture, and said alkyl- or dialkylphenyl polyethoxy alcohol and N-substituted acid amide are present in said mixture in approximately equal molar amounts.

11. An additive according to claim 10, in which each of said alkyl- or dialkylphenyl polyethoxy alcohol and said N-substituted acid amide constitutes at least 35 wt.% of said mixture.

12. An additive according to claim 9, in which said alkyl- or dialkylphenyl polyethoxy alcohol, N-substituted acid amide and ethoxylated fatty alcohol are selected to react with each other in said mixture.

13. An additive according to claim 12, in which said additive concentration is between approximately 50 and 1000 p.p.m.

14. An additive according to claim 12, in which said alkylphenyl polyethoxy alcohol has the formula

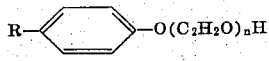

in which R is selected from $C_{8-9}H_{17-19}$ and $C_{12}H_{25}$ and n has the numerical of 4 to 12, and said N-substituted acid amide is selected from substances having one of the below formulas $$R - CON(C_2H_4OH)_2$$

in which R—CO is selected from the group consisting of the acyl groups of coconut, lauric, methyl lauric and myristic acids, and mixtures thereof, and

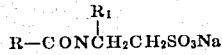

in which R—CO is selected from the group consisting of the acyl groups of coconut, oleic, palmitic, tall oil and tallow acids, and $R_1$ is selected from the group consisting of methyl and cyclohexyl groups.

15. An additive according to claim 14, in which each of said alkyl- or dialkylphenyl polyethoxy alcohol and said N-substituted acid amide constitutes at least 35 wt.% of said mixture.

16. In the method of removing particulate matter from a gaseous flow by contacting the particle laden gaseous flow with water in a wet collection apparatus, the step of adding to said water an additive consisting essentially of a mixture of an alkyl- or dialkylphenyl polyethoxy alcohol, an N-substituted acid amide and an ethoxylated fatty alcohol, with the concentration of said additive in the water being approximately 5 to 5000 p.p.m.

17. The method according to claim 16, in which said ethoxylated fatty alcohol constitutes approximately ½ to 40 wt.% of said mixture, and said alkyl- or dialkylphenyl poly-ethoxy alcohol and N-substituted acid amide are present in said mixture in approximately equal molar amounts.

18. The method according to claim 17, in which each of said alkyl- or dialkyphenyl polyethoxy alcohol and said N-substituted acid amide constitutes at least 35 wt.% of said mixture.

19. The method according to claim 16, in which said alkyl- or dialkylphenyl polyethoxy alcohol, N-substituted acid amide and ethoxylated fatty alcohol are selected to react with each other in said mixture.

20. The method according to claim 19, in which said additive concentration is between approximately 50 and 1000 p.p.m.

21. The method according to claim 19, in which said alkylphenyl polyethoxy alcohol has the formula

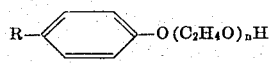

in which R is selected from $C_{8-9}H_{17-19}$ and $C_{12}H_{25}$ and n has the numerical of 4 to 12, and said N-substituted acid amide is selected from substances having one of the below formulas $$R—CON(C_2H_4OH)_2$$

in which R—CO is selected from the group consisting of the acyl groups of coconut, lauric, methyl lauric and myristic acids, and mixtures thereof, and

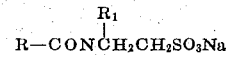

in which R—CO is selected from the group consisting of the acyl groups of coconut, oleic, palmitic, tall oil and tallow acids, and $R_1$ is selected from the group consisting of methyl and cyclohexyl groups.

22. The method according to claim 21, in which each of said alkyl- or dialkylphenyl polyethoxy alcohol and said N-substituted acid amide constitutes at least 35 wt.% of said mixture.

23. The method according to claim 16, in which there is further added to the water an antifoaming agent in a concentration between approximately 5 and 500 p.p.m.

* * * * *